V. PALUMBOS.
TRIPOD HEAD LOCKING DEVICE.
APPLICATION FILED JAN. 16, 1914.
1,120,843.
Patented Dec. 15, 1914.
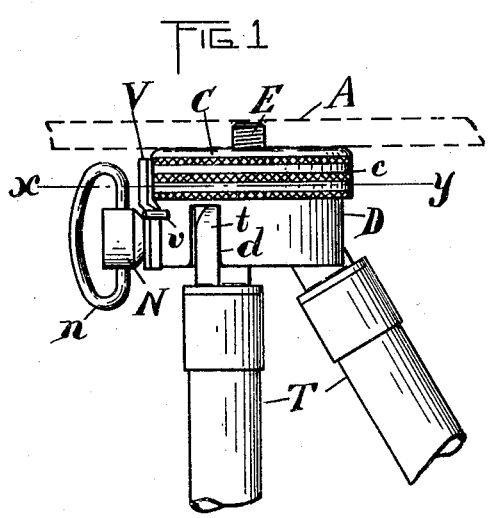
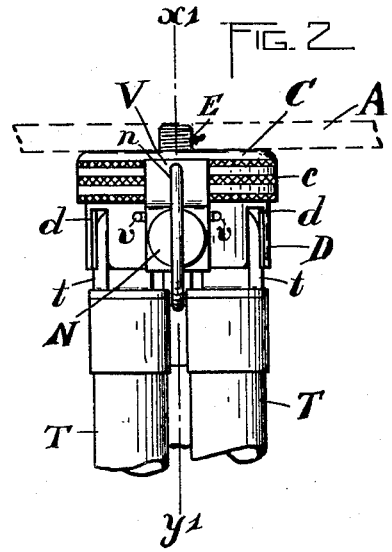
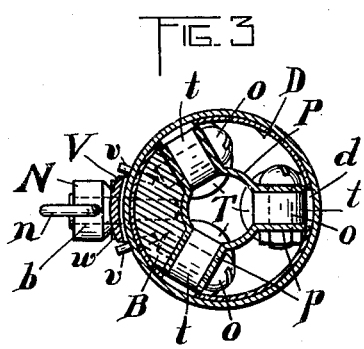
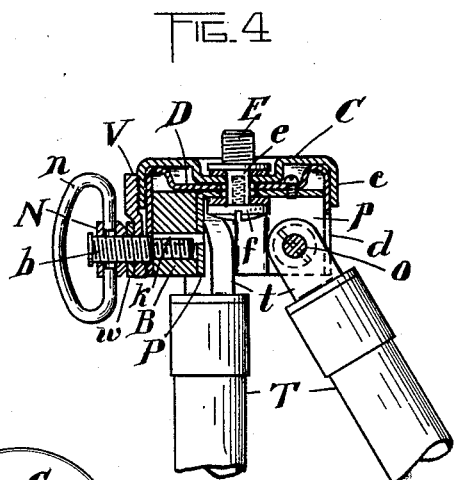
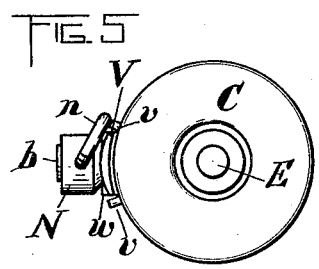
WITNESSES:
Elmer H Schultz
Elsie L McDonald
INVENTOR:
Vincent Palumbos
By Osborne F Gurney
ATTY.

UNITED STATES PATENT OFFICE.

VINCENT PALUMBOS, OF ROCHESTER, NEW YORK.

TRIPOD-HEAD-LOCKING DEVICE.

1,120,843.  Specification of Letters Patent.  Patented Dec. 15, 1914.

Application filed January 16, 1914. Serial No. 812,538.

*To all whom it may concern:*

Be it known that I, VINCENT PALUMBOS, a citizen of the United States, residing at Rochester, in the county of Monroe and State of New York, have invented a new and Improved Tripod-Head-Locking Device, of which the following is a specification.

My invention relates to tripods of that class in which the member for supporting the instrument, such as a camera, is rotatably mounted on the head proper in order that the instrument may be turned to any desired position of angular adjustment without having to change the position of the tripod legs. When using a tripod of this class, however, for supporting a camera it often happens that loading the camera after it has been properly focused, or accidentally giving it a sudden jar, will cause the supporting member to rotate slightly, thus moving the camera out of its proper position of angular adjustment. This angular movement may be noticeable and, if so, the camera can easily be readjusted, although requiring an operation that should be made unnecessary; but when it is not noticed, even though such movement be very slight, the result will be a photograph that does not include all objects as intended.

It is the object, then, of this invention to provide a device that will clamp the instrument supporting member and securely lock the same in any desired position of angular adjustment, and one that can readily be operated without any danger of accidentally jarring the instrument. I attain this object by providing a locking device such as shown in the accompanying drawings, in which—

Figure 1 is an elevation of the upper end or head of a tripod equipped with my locking device, such device being seen in side view; Fig. 2, a view from the left of the parts seen in Fig. 1; Fig. 3, a horizontal sectional view taken along the line $x$—$y$ of Fig. 1 with all parts above such line removed; Fig. 4, a vertical sectional view taken along the line $x^1$—$y^1$ of Fig. 2 with all parts to the right of such line removed; and Fig. 5, a plan view of the tripod seen in Fig. 1 but with all of the legs thereof in their folded position and with the operating key turned to its inoperative position.

Similar letters refer to similar parts throughout the several views.

At T are seen the usual tripod legs each having a centrally disposed extension $t$ at its upper end engaging between ears $p$, bent downward from the plate P, and pivotally supported on a bolt $o$ connecting a pair of such ear members $p$, as shown in Figs. 3 and 4. The plate P is secured by means of screws to the underside of the head of the inverted cup shape member or shell D, such head comprising the base plate of the tripod head, and slots $d$ are provided in the side wall of the shell D to permit angular movement of the tripod legs. The instrument supporting member comprises a cap C which is rotatably mounted on the head of the shell D with the flange $c$ of such cap engaging outside of the shell.

The tripod head is provided with a centrally disposed vertically extending bolt E having its upper end threaded for screwing into the base of the instrument to be supported, the base of such an instrument being indicated in dotted lines in Figs. 1 and 2. This bolt E is provided with a shoulder at approximately half way of its length and below such shoulder it is made square so as to engage through a square opening therefor in the depressed central portion of the cap C and thereby be caused to rotate with such cap. The square extension engages, also, through an enlarged opening in the head of the shell D and the plate P and has a screw $f$ threaded vertically into the end thereof, such screw having an enlarged head which, with the shoulder on the bolt E, holds the cap C against removal.

It is necessary, in order to properly adjust the camera, if that is the instrument being used, that the supporting member C be quite freely rotatable, and, as it would be quite impractical and ofttimes impossible, owing to the angular position of the tripod legs T, to adjust the screw $f$ after the camera has been properly positioned, I have provided a locking device located at the side of the tripod head and now to be described.

At B in Figs. 3 and 4, there is seen a block engaging between two of the ear members $p$ and located directly opposite one of the tripod legs T. This block B may be held in place by any suitable means such as two of the bolts $o$ extending thereinto, or may be formed integrally with either the plate P or the shell D. A stud $b$ extends through an opening therefor in the shell D, is threaded into the block B and held against rotation by any suitable means such as the key $k$. This stud $b$ is threaded to receive the jam nut N and the outer end thereof is afterward enlarged slightly to prevent the removal of the nut N.

The clamping or locking member V is, preferably, a rectangular plate having a hole therein to permit its engagement over the stud $b$ and having its inner upper face roughened or knurled so as to engage firmly the knurled surface on the flange $c$ of the instrument supporting member C. This plate V may be heavy enough so that it need only engage with its upper end against the flange $c$ of the member C in order to hold such member against rotation, although I prefer to make the plate out of comparatively thin material and conform it, as indicated in the drawings, so that it will engage with a springing action with the upper end thereof against the flange $c$ and the lower end against the shell D.

A washer $w$ is placed between the plate V and the nut N, and the latter is provided with a suitable operating member or key $n$ which may be turned to the position indicated in Fig. 5 when not in use. The locking plate V is movable longitudinally on the stud $b$ and is prevented from rotation thereon by means of pins $v$, one on each side thereof, which extend outward from the block B through holes therefor in the shell D. After the tripod has been properly set and the camera turned to its proper angular position by rotation of the supporting member C, the operator turns the nut N thereby clamping the plate V against the flange $c$ of the member C and thus locks such member against further rotation until the nut N has been turned to again release the plate V. A half turn of the nut N is sufficient to force the plate V into operative position.

It is believed from the foregoing description that the construction, purpose and method of using the locking device are sufficiently clear to call for no further explanation herein.

What I claim is:

1. A device for the purpose described comprising, in combination with a tripod head and an instrument supporting member rotatably mounted thereon, a stud carried by said head, a member longitudinally movable on said stud adapted to engage said instrument supporting member to lock the same against rotation, and means for holding said longitudinally movable member in such locking engagement.

2. A device for the purpose described comprising, in combination with a tripod head and an instrument supporting member rotatably mounted thereon, a stud carried by said head, a clamping plate longitudinally movable on said stud adapted to engage said head and said instrument supporting members to lock the latter against rotation, and means longitudinally movable on said stud for forcing and holding said clamping plate in operative position.

3. A device for the purpose described comprising, in combination with a tripod head and an instrument supporting member rotatably mounted thereon, a stud carried by said head, a clamping plate longitudinally movable on said stud and adapted to engage said instrument supporting member to lock such member against rotation, and means longitudinally movable on said stud for forcing and holding said clamping plate in operative position.

4. A device for the purpose described comprising, in combination with a tripod head and an instrument supporting member rotatably mounted thereon, a stud carried by said head, a clamping plate longitudinally movable on said stud and adapted to engage said instrument supporting member to lock such member against rotation, means for preventing rotation of said clamping plate on said stud, and means longitudinally movable on said stud for forcing and holding said clamping plate in operative position.

5. A device for the purpose described comprising, in combination with a tripod head and an instrument supporting member rotatably mounted thereon, a block removably secured to said head, a stud carried by said block, a clamping plate longitudinally movable on said stud and adapted to engage said instrument supporting member to lock such member against rotation, means carried by said block for preventing rotation of said clamping plate on said stud, and means longitudinally movable on said stud for forcing and holding said clamping plate in operative position.

VINCENT PALUMBOS.

Witnesses:
ELMER H. SCHULTZ,
ELSIE L. MCDONALD.